(12) United States Patent
Omoigui (10) Patent No.: US 7,237,254 B1
(45) Date of Patent: Jun. 26, 2007

(54) SEAMLESS SWITCHING BETWEEN DIFFERENT PLAYBACK SPEEDS OF TIME-SCALE MODIFIED DATA STREAMS

(75) Inventor: Nosakhare D. Omoigui, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 0 days.

(21) Appl. No.: 09/539,170

(22) Filed: Mar. 29, 2000

(51) Int. Cl.
*H04N 7/173* (2006.01)

(52) U.S. Cl. .......................... 725/94; 709/231
(58) Field of Classification Search ............... 725/88, 725/102, 93, 94
See application file for complete search history.

(56) References Cited

U.S. PATENT DOCUMENTS

| | | | |
|---|---|---|---|
| 4,931,950 A | 6/1990 | Isle et al. ................ 364/513 |
| 5,050,161 A | 9/1991 | Golestani .................. 370/60 |
| 5,119,474 A | 6/1992 | Beitel et al. .............. 395/154 |
| 5,274,758 A | 12/1993 | Beitel et al. .............. 395/154 |
| 5,309,562 A | 5/1994 | Li ............................ 395/200 |
| 5,313,454 A | 5/1994 | Bustini et al. ............. 370/13 |
| 5,341,474 A | 8/1994 | Gelman et al. ........... 395/200 |
| 5,414,455 A | 5/1995 | Hooper et al. .............. 348/7 |
| 5,434,848 A | 7/1995 | Chimento, Jr. et al. .... 370/17 |
| 5,455,910 A | 10/1995 | Johnson et al. ........... 395/650 |
| 5,481,542 A | 1/1996 | Logston et al. .......... 370/94.2 |
| 5,490,252 A | 2/1996 | Macera et al. ........ 395/200.01 |
| 5,504,744 A | 4/1996 | Adams et al. ........... 370/60.1 |
| 5,519,701 A | 5/1996 | Colmant et al. .......... 370/60.1 |
| 5,521,630 A | 5/1996 | Chen et al. ................. 348/7 |
| 5,533,021 A | 7/1996 | Branstad et al. ......... 370/60.1 |
| 5,537,408 A | 7/1996 | Branstad et al. ........... 370/79 |
| 5,541,955 A | 7/1996 | Jacobsmeyer ............. 375/222 |
| 5,559,942 A | 9/1996 | Gough et al. ............. 395/155 |
| 5,566,175 A | 10/1996 | Davis ......................... 370/84 |
| 5,574,724 A | 11/1996 | Bales et al. .............. 370/68.1 |
| 5,606,359 A * | 2/1997 | Youden et al. ............. 725/88 |
| 5,614,940 A | 3/1997 | Cobbley et al. ............. 348/7 |
| 5,617,423 A | 4/1997 | Li et al. .................... 370/426 |
| 5,623,690 A | 4/1997 | Palmer et al. ............. 395/806 |
| 5,625,405 A | 4/1997 | DuLac et al. ................ 348/7 |
| 5,640,320 A | 6/1997 | Jackson et al. ............ 364/192 |

(Continued)

FOREIGN PATENT DOCUMENTS

| | | |
|---|---|---|
| EP | 0605115 | 7/1994 |
| EP | 0653884 | 5/1995 |
| EP | 0 669 587 A2 | 8/1995 |
| EP | 0676898 | 10/1995 |
| EP | 0746158 | 12/1996 |
| EP | 0 812 112 A2 | 10/1997 |
| WO | WO 94/01964 | 1/1994 |
| WO | WO 98/37698 | 8/1998 |

OTHER PUBLICATIONS

H.J. Chen et al., "A Scalable Video-on-Demand Service for the Provision of VCR-Like Functions," IEEE, May 15, 1995, pp. 65-72.

(Continued)

*Primary Examiner*—Andrew Y. Koenig
(74) *Attorney, Agent, or Firm*—Perkins Coie LLP (57) ABSTRACT

In a network environment, multimedia content is streamed from a server computer to a client computer via the network. A user of the client computer can alter the speed at which the multimedia content is played; either speeding up or slowing down the playback. The client seamlessly switches between the different playback speeds, reducing breaks and/or delays between the time the user selects the new playback speed and the time the multimedia content begins being played back at the new speed.

16 Claims, 9 Drawing Sheets

U.S. PATENT DOCUMENTS

| | | | |
|---|---|---|---|
| 5,664,227 A | 9/1997 | Mauldin et al. | 395/778 |
| 5,692,213 A | 11/1997 | Goldberg et al. | 395/806 |
| 5,699,474 A * | 12/1997 | Suzuki et al. | 386/68 |
| 5,717,691 A | 2/1998 | Dighe et al. | 370/401 |
| 5,717,869 A | 2/1998 | Moran et al. | 395/339 |
| 5,719,786 A | 2/1998 | Nelson et al. | 364/514 |
| 5,721,829 A | 2/1998 | Dunn et al. | 395/200.49 |
| 5,742,347 A | 4/1998 | Kandlur et al. | 348/426 |
| 5,768,533 A | 6/1998 | Ran | 395/200.77 |
| 5,786,814 A | 7/1998 | Moran et al. | 345/328 |
| 5,794,210 A | 8/1998 | Goldhaber et al. | 705/14 |
| 5,794,249 A | 8/1998 | Orsolini et al. | 707/104 |
| 5,799,292 A | 8/1998 | Hekmatpour | 706/11 |
| 5,801,685 A | 9/1998 | Miller et al. | 345/302 |
| 5,808,662 A | 9/1998 | Kinney et al. | 348/15 |
| 5,818,510 A | 10/1998 | Cobbley et al. | 348/7 |
| 5,822,537 A | 10/1998 | Katseff et al. | 395/200.61 |
| 5,828,848 A | 10/1998 | MacCormack et al. | 395/200.77 |
| 5,835,495 A | 11/1998 | Ferriere | 370/465 |
| 5,835,667 A | 11/1998 | Wactlar et al. | 386/96 |
| 5,838,906 A | 11/1998 | Doyle et al. | 395/200.32 |
| 5,859,641 A | 1/1999 | Cave | 345/348 |
| 5,864,682 A | 1/1999 | Porter et al. | 395/200.77 |
| 5,870,755 A | 2/1999 | Stevens et al. | 707/104 |
| 5,873,735 A | 2/1999 | Yamada et al. | 434/316 |
| 5,892,506 A | 4/1999 | Hermanson | 345/302 |
| 5,903,673 A | 5/1999 | Wang et al. | 382/236 |
| 5,918,002 A | 6/1999 | Klemets et al. | 395/182.16 |
| 5,930,787 A | 7/1999 | Minakuchi et al. | 707/4 |
| 5,953,506 A | 9/1999 | Kalra et al. | 395/200.61 |
| 5,956,716 A | 9/1999 | Kenner et al. | 707/10 |
| 5,963,202 A * | 10/1999 | Polish | 715/723 |
| 5,995,941 A | 11/1999 | Maquire et al. | 705/10 |
| 5,999,979 A | 12/1999 | Vellanki et al. | 709/232 |
| 6,006,241 A | 12/1999 | Purnaveja et al. | 707/512 |
| 6,014,706 A | 1/2000 | Cannon et al. | 709/231 |
| 6,023,731 A | 2/2000 | Chawla | 709/231 |
| 6,032,130 A | 2/2000 | Alloul et al. | 705/27 |
| 6,035,341 A | 3/2000 | Nunally et al. | 709/253 |
| 6,041,345 A | 3/2000 | Levi et al. | 709/217 |
| 6,049,823 A | 4/2000 | Hwang | 709/218 |
| 6,064,794 A | 5/2000 | McLaren et al. | 386/68 |
| 6,118,450 A | 9/2000 | Proehl et al. | 345/349 |
| 6,118,817 A | 9/2000 | Wang | 375/240 |
| 6,128,653 A | 10/2000 | Del Val et al. | 709/219 |
| 6,133,920 A | 10/2000 | DeCarmo et al. | 345/354 |
| 6,144,375 A | 11/2000 | Jain et al. | 345/302 |
| 6,148,304 A | 11/2000 | De Vries et al. | 707/104 |
| 6,154,771 A | 11/2000 | Rangan et al. | 709/217 |
| 6,166,314 A | 12/2000 | Weinstock et al. | 84/483.1 |
| 6,173,317 B1 | 1/2001 | Chaddha et al. | 709/219 |
| 6,204,840 B1 | 3/2001 | Petelycky et al. | 345/302 |
| 6,215,910 B1 | 4/2001 | Chaddha | 382/253 |
| 6,230,172 B1 | 5/2001 | Purnaveja et al. | 707/512 |
| 6,233,389 B1 | 5/2001 | Barton et al. | 386/46 |
| 6,363,207 B1 * | 3/2002 | Duruoz et al. | 386/68 |
| 6,370,688 B1 * | 4/2002 | Hejna, Jr. | 725/101 |
| 6,614,843 B1 * | 9/2003 | Gordon et al. | 375/240.01 |
| 2003/0163824 A1 * | 8/2003 | Gordon et al. | 725/90 |

OTHER PUBLICATIONS

Lynda Hardman et al., "Multimedia authoring paradigms," *Authoring and Application of Hypermedia-Based User-Interfaces, IEE Colloquium,*,The Institution of Electrical Engineers 1995, pp. 8/1-8/3.

John David N. Dionisio and Alfonso F. Cardenas, "A Unified Data Model for Representing Multimedia, Timeline, and Simulation Data," *IEEE Transactions on Knowledge and Data Engineering,* vol. 10, No. 5, Sep./Oct. 1998, pp. 746-767.

Microsoft Corporation and RealNetworks, Inc., Advanced Streaming Format (ASF) Specification, Feb. 26, 1998, Public Specification Version 1.0, 55 pages.

Arons, Barry, "SpeechSkimmer: A System for Interactively Skimming Recorded Speech", ACM Transactions on Computer-Human, vol. 4, No. 1, pp. 3-38, 1997.

Internet Reference "An Annotated Bibliography of Interactive Speech User Interfaces by Barry Arons" HTTP://barons.www.media.mit.edu/people/barons/AronsAnnotatedBibliography.html, Sep. 15, 1998.

"GSM Full Rate Speech Transcoding," ETSI/PT 12, Feb. 1992, pp. 1-93.

"Speech codee for the European Mobile Radio System," P. Vary et al., 1988, pp. 227-230.

Informedia—Internet References, http://www.informedia.cs.cmu.edu, Dec. 20, 1996.

* cited by examiner

SEAMLESS SWITCHING BETWEEN DIFFERENT PLAYBACK SPEEDS OF TIME-SCALE MODIFIED DATA STREAMS

TECHNICAL FIELD

This invention relates to rendering data streams. More particularly, the invention relates to switching between different playback speeds of time-scale modified data streams.

BACKGROUND OF THE INVENTION

Multimedia streaming—the continuous delivery of synchronized media data like video, audio, text, and animation—is a critical link in the digital multimedia revolution. Today, streaming media is primarily about video and audio, but a richer, broader digital media era is emerging with a profound and growing impact on the Internet and digital broadcasting.

Synchronized media refers to multiple media objects that share a common timeline. Video and audio are examples of synchronized media—each is a separate data stream with its own data structure, but the two data streams are played back in synchronization with each other. Virtually any media type can have a timeline. For example, an image object can change like an animated .gif file: text can change and move, and animation and digital effects happen over time. This concept of synchronizing multiple media types is gaining greater meaning and currency with the emergence of more sophisticated media composition frameworks implied by MPEG-4, Dynamic HTML, and other media playback environments.

The term "streaming" is used to indicate that the data representing the various media types is provided over a network to a client computer on a real-time, as-needed basis, rather than being pre-delivered in its entirety before playback. Thus, the client computer renders streaming data as it is received from a network server, rather than waiting for an entire "file" to be delivered.

The widespread availability of streaming multimedia enables a variety of informational content that was not previously available over the Internet or other computer networks. Live content is one significant example of such content. Using streaming multimedia, audio, video, or audio/visual coverage of noteworthy events can be broadcast over the Internet as the events unfold. Similarly, television and radio stations can transmit their live content over the Internet.

A U.S. patent application entitled "Multimedia Timeline Modification in Networked Client/Server Systems," filed Sep. 15, 1998, Ser. No. 09/153,664, by inventors Anoop Gupta and Nosakhare D. Omoigui, describes a system that allows a user to vary the playback speed of streaming multimedia content using time-scale modification technology. A U.S. patent application entitled "Timeline Correlation Between Multiple Timeline-Altered Media Streams," filed Sep. 15, 1998, Ser. No. 09/153,749, by inventors Anoop Gupta, Nosakhare D. Omoigui, and Liwei He, describes a system that utilizes time-scale modification so that a user can vary the speed of streaming content without destroying its intelligibility.

Although such systems allow a user to change the playback speed of streaming multimedia content without destroying its intelligibility, such changes are not always "seamless". There may be rather lengthy delays, from the user's perspective, between the user's request for a new playback speed and the actual rendering of the data at that requested speed. Additionally, there may be breaks in the data where the user is presented with either a "paused" view of the streaming data or no data at all until the system is able to render the stream at the requested speed. These problems degrade the overall user experience in playing back the multimedia content.

The invention described below addresses these problems, reducing delays and breaks when switching between different playback speeds of time-scale modified streams.

SUMMARY OF THE INVENTION

In a network environment, multimedia content is streamed from a server computer to a client computer via the network. A user of the client computer can alter the speed at which the multimedia content is played, either speeding up or slowing down the playback. When the playback speed of the multimedia content is changed, the invention seamlessly switches between the previous playback speed and the new playback speed.

According to one aspect of the invention, flow control is used to provide seamless switching between different playback speeds. The client computer performs time-scale modification on data streams received from the server in order to obtain the playback speed requested by the user. When a new playback speed is selected by the user, the server aggressively refills the client's data buffers in order to ensure that the client has sufficient data to immediately begin time-scale modification for the new playback speed.

According to another aspect of the invention, a data stream is transferred form the server to the client as a series of data packets. The rate at which the packets are transferred to the client is based on the playback speed selected by the user, and each packet is tagged with the playback speed to which it corresponds. In embodiments where the time-scale modification is implemented in the client, the client modifies the time-scale of the data stream based on these tags. In embodiments where the time-scale modification is implemented in the server, the received time-scale modified data is rendered by the client at a playback speed according to the tags.

According to another aspect of the invention, multiple different versions of multimedia content are stored at the server, each version corresponding to a different playback speed. When a user selects a new playback speed, a different one of these multiple versions is provided from the server to the client. During the process of switching versions, the server continues to transfer data from the previous version to the client until the proper location in the new stream to begin transferring is identified. Once the proper location is identified, the server stops transferring data from the previous version and begins transferring data from the new version.

BRIEF DESCRIPTION OF THE DRAWINGS

The present invention is illustrated by way of example and not limitation in the figures of the accompanying drawings. The same numbers are used throughout the figures to reference like components and/or features.

DETAILED DESCRIPTION

General Network Structure

Figure 1:
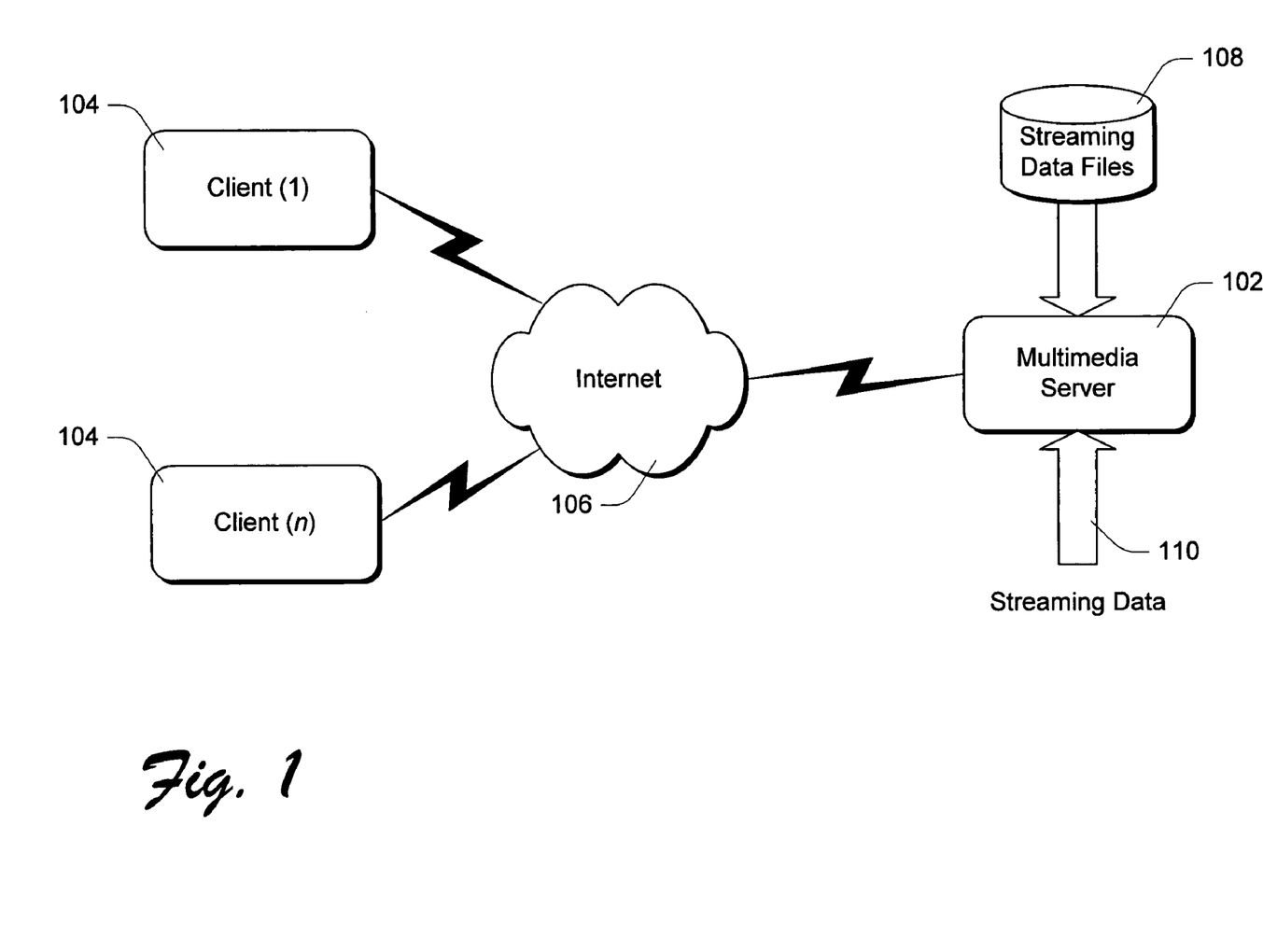
FIG. 1 shows a client/server network system and environment in accordance with the invention.

FIG. 1 shows a client/server network system and environment in accordance with the invention. Generally, the system includes one or more network server computers 102, and multiple (n) network client computers 104. The computers communicate with each other over a data communications network. The communications network in FIG. 1 comprises a public network 106 such as the Internet. The data communications network might also include local-area networks and private wide-area networks.

Multimedia server 102 has access to streaming media content in the form of different media streams. These media streams can be individual media streams (e.g., audio, video, graphical, etc.), or alternatively composite media streams including multiple such individual streams. Some media streams might be stored as files 108 in a database or other file storage system, while other media streams 110 might be supplied to the server on a "live" basis from other data source components through dedicated communications channels or through the Internet itself.

Generally, the client computers 104 are responsive to user input to select or request identified media streams. In response to a request for a media stream, multimedia server 102 streams the requested media stream to the client 104 in accordance with some known format. The client 104 renders the media stream to produce the content of the stream.

The invention allows a user to seamlessly switch between different playback speeds of time-scale modified media streams. For example, a user at a client computer 104 may wish to speed up (compressing the time scale) or slow down (expanding the time scale) the playback of a media stream from multimedia server 102. This switching may involve either time-scale modification performed "on the fly" at the client and/or the server, or alternatively switching between different streams that are two different versions of the same multimedia content. The invention uses various techniques to seamlessly switch between the different playback speeds.

Exemplary Computer Environment

In the discussion below, the invention will be described in the general context of computer-executable instructions, such as program modules, being executed by one or more conventional personal computers. Generally, program modules include routines, programs, objects, components, data structures, etc. that perform particular tasks or implement particular abstract data types. Moreover, those skilled in the art will appreciate that the invention may be practiced with other computer system configurations, including hand-held devices, multiprocessor systems, microprocessor-based or programmable consumer electronics, network PCs, minicomputers, mainframe computers, and the like. In a distributed computer environment, program modules may be located in both local and remote memory storage devices.

Alternatively, the invention could be implemented in hardware or a combination of hardware, software, and/or firmware. For example, one or more application specific integrated circuits (ASICs) could be programmed to carry out the invention.

Figure 2:
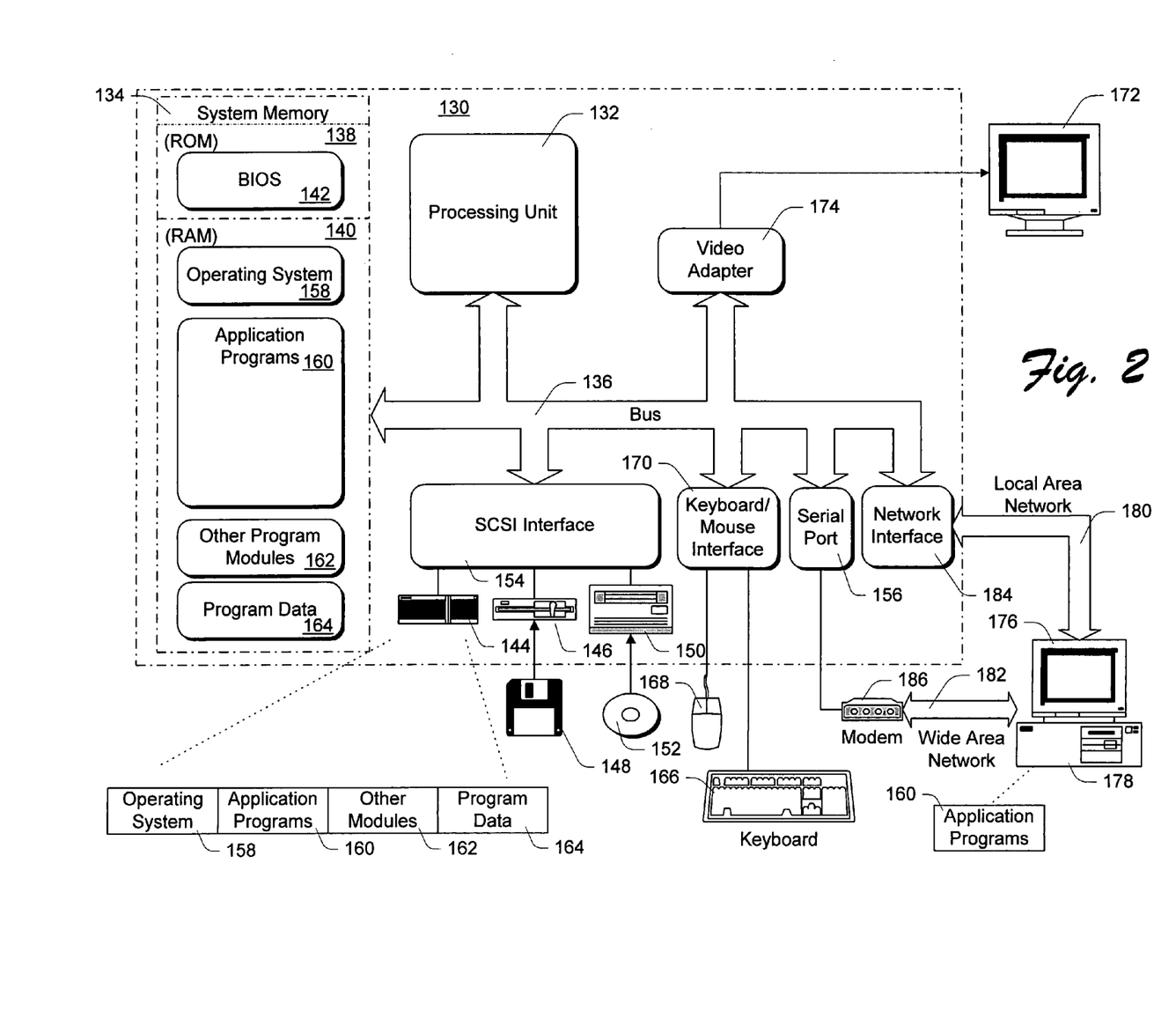
FIG. 2 shows a general example of a computer that can be used as a server or client in accordance with the invention.

FIG. 2 shows a general example of a computer 130 that can be used as a server or client in accordance with the invention. Computer 130 is shown as an example of a computer that can perform the functions of a server computer 102 or a client computer 104 of FIG. 1.

Computer 130 includes one or more processors or processing units 132, a system memory 134, and a bus 136 that couples various system components including the system memory 134 to processors 132.

The bus 136 represents one or more of any of several types of bus structures, including a memory bus or memory controller, a peripheral bus, an accelerated graphics port, and a processor or local bus using any of a variety of bus architectures. The system memory includes read only memory (ROM) 138 and random access memory (RAM) 140. A basic input/output system (BIOS) 142, containing the basic routines that help to transfer information between elements within computer 130, such as during start-up, is stored in ROM 138. Computer 130 further includes a hard disk drive 144 for reading from and writing to a hard disk, not shown, a magnetic disk drive 146 for reading from and writing to a removable magnetic disk 148, and an optical disk drive 150 for reading from or writing to a removable optical disk 152 such as a CD ROM or other optical media. The hard disk drive 144, magnetic disk drive 146, and optical disk drive 150 are connected to the bus 136 by an SCSI interface 154 or some other appropriate interface. The drives and their associated computer-readable media provide nonvolatile storage of computer readable instructions, data structures, program modules and other data for computer 130. Although the exemplary environment described herein employs a hard disk, a removable magnetic disk 148 and a removable optical disk 152, it should be appreciated by those skilled in the art that other types of computer readable media which can store data that is accessible by a computer, such as magnetic cassettes, flash memory cards, digital video disks, random access memories (RAMs) read only memories (ROM), and the like, may also be used in the exemplary operating environment.

A number of program modules may be stored on the hard disk, magnetic disk 148, optical disk 152, ROM 138, or RAM 140, including an operating system 158, one or more application programs 160, other program modules 162, and program data 164. A user may enter commands and information into computer 130 through input devices such as keyboard 166 and pointing device 168. Other input devices (not shown) may include a microphone, joystick, game pad, satellite dish, scanner, or the like. These and other input devices are connected to the processing unit 132 through an interface 170 that is coupled to the bus 136. A monitor 172 or other type of display device is also connected to the bus 136 via an interface, such as a video adapter 174. In addition to the monitor, personal computers typically include other peripheral output devices (not shown) such as speakers and printers.

Computer 130 operates in a networked environment using logical connections to one or more remote computers, such as a remote computer 176. The remote computer 176 may be another personal computer, a server, a router, a network PC, a peer device or other common network node, and typically includes many or all of the elements described above relative to computer 130, although only a memory storage device 178 has been illustrated in FIG. 2. The logical connections depicted in FIG. 2 include a local area network (LAN) 180 and a wide area network (WAN) 182. Such networking environments are commonplace in offices, enterprise-wide computer networks, intranets, and the Internet. In the described embodiment of the invention, remote computer 176 executes an Internet Web browser program such as the "Internet Explorer" Web browser manufactured and distributed by Microsoft Corporation of Redmond, Wash.

When used in a LAN networking environment, computer 130 is connected to the local network 180 through a network interface or adapter 184. When used in a WAN networking environment, computer 130 typically includes a modem 186 or other means for establishing communications over the wide area network 182, such as the Internet. The modem 186, which may be internal or external, is connected to the bus 136 via a serial port interface 156. In a networked environment, program modules depicted relative to the personal computer 130, or portions thereof, may be stored in the remote memory storage device. It will be appreciated that the network connections shown are exemplary and other means of establishing a communications link between the computers may be used.

Generally, the data processors of computer 130 are programmed by means of instructions stored at different times in the various computer-readable storage media of the computer. Programs and operating systems are typically distributed, for example, on floppy disks or CD-ROMs. From there, they are installed or loaded into the secondary memory of a computer. At execution, they are loaded at least partially into the computer's primary electronic memory. The invention described herein includes these and other various types of computer-readable storage media when such media contain instructions or programs for implementing the steps described below in conjunction with a microprocessor or other data processor. The invention also includes the computer itself when programmed according to the methods and techniques described below. Furthermore, certain sub-components of the computer may be programmed to perform the functions and steps described below. The invention includes such sub-components when they are programmed as described. In addition, the invention described herein includes data structures, described below, as embodied on various types of memory media.

For purposes of illustration, programs and other executable program components such as the operating system are illustrated herein as discrete blocks, although it is recognized that such programs and components reside at various times in different storage components of the computer, and are executed by the data processor(s) of the computer.

Streaming Media

In this discussion, the term "composite media stream" describes synchronized streaming data that represents a segment of multimedia content. The composite media stream has a timeline that establishes the speed at which the content is rendered. The composite media stream can be rendered to produce a plurality of different types of user-perceivable media, including synchronized audio or sound, video graphics or motion pictures, animation, textual content, command script sequences, or other media types that convey time-varying information or content in a way that can be sensed and perceived by a human. A composite media stream comprises a plurality of individual media streams representing the multimedia content. Each of the individual media streams corresponds to and represents a different media type and each of the media streams can be rendered by a network client to produce a user-perceivable presentation using a particular presentation medium. The individual media streams have their own timelines, which are synchronized with each other so that the media streams can be rendered simultaneously for a coordinated multimedia presentation. The individual timelines define the timeline of the composite stream.

There are various standards for streaming media content and composite media streams. "Advanced Streaming Format" (ASF) is an example of such a standard, including both accepted versions of the standard and proposed standards for future adoption. ASF specifies the way in which multimedia content is stored, streamed, and presented by the tools, servers, and clients of various multimedia vendors. ASF provides benefits such as local and network playback, extensible media types, component download, scaleable media types, prioritization of streams, multiple language support, environment independence, rich inter-stream relationships, and expandability. Further details about ASF are available from Microsoft Corporation of Redmond, Wash.

Regardless of the streaming format used, an individual data stream contains a sequence of digital data sets or units that are rendered individually, in sequence, to produce an image, sound, or some other stimuli that is perceived by a human to be continuously varying. For example, an audio data stream comprises a sequence of sample values that are converted to a pitch and volume to produce continuously varying sound. A video data stream comprises a sequence of digitally-specified graphics frames that are rendered in sequence to produce a moving picture.

Typically, the individual data units of a composite media stream are interleaved in a single sequence of data packets. Various types of data compression might be used within a particular data format to reduce communications bandwidth requirements.

The sequential data units (such as audio sample values or video frames) are associated with both delivery times and presentation times, relative to an arbitrary start time. The delivery time of a data unit indicates when the data unit should be delivered to a rendering client. The presentation time indicates when the value should be actually rendered. Normally, the delivery time of a data unit precedes its presentation time.

The presentation times determine the actual speed of playback. For data streams representing actual events or performances, the presentation times correspond to the relative times at which the data samples were actually recorded. The presentation times of the various different individual data streams are consistent with each other so that the streams remain coordinated and synchronized during playback.

Multimedia Time-Scale Modification

A network client 104 of FIG. 1 can accept a speed designation from a user. In the illustrated example, the speed designation is a speed factor relative to the original or default playback speed of the selected multimedia stream. For example, a speed factor of 1.2 indicates that the composite media stream is to be rendered at 1.2 times its original or default speed, thereby achieving time compression. A speed factor of 0.8 indicates that the composite media stream is to be rendered at 0.8 times its original or default speed, thereby achieving time expansion.

In response to the speed designation from the user, the system modifies the timelines of the individual media streams of the composite media stream, while keeping the timelines synchronized with each other and while maintaining the original pitch of any audio produced from audio streams. In one embodiment of the invention, such timeline modification is performed by the network client. In other embodiments of the invention, the timeline modification can be performed at the network server, before the media streams are streamed to the network client.

Timeline modification changes the timeline of the received data streams in accordance with the user speed designation to achieve either time compression or time expansion. With some types of media, such as video streams, this involves either omitting selected frames or modifying the presentation times of the individual data units or video frames. In other cases, such as with audio streams, the time-modification is more difficult—simply changing the presentation times would alter the pitch of the original audio and make it unintelligible. Accordingly, some type of audio processing technique is used to time-compress or time-expand audio streams, while maintaining the original pitch of the audio—thereby maintaining the intelligibility of the audio.

There are various known methods of audio time modification, commonly referred to as "time-scale modification," most of which concentrate on removing redundant information from the speech signal. In a method referred to as sampling, short segments are dropped from the speech signal at regular intervals. Cross fading or smoothing between adjacent segments improves the resulting sound quality.

Another method, referred to as synchronized overlap add method (SOLA or OLA), consists of shifting the beginning of a new speech segment over the end of the preceding segment to find the point of highest cross-correlation (i.e., maximum similarity). The overlapping frames are averaged, or smoothed together, as in the sampling method.

Sampling with dichotic presentation is a variant of the sampling method that takes advantage of the auditory system's ability to integrate information from both ears. In improves on the sampling method by playing the standard sampled signal to one ear and the "discarded" material to the other ear. Intelligibility and compression increase under this dichotic presentation condition when compared with standard presentation techniques.

The methods mentioned above are considered "linear" because all portions of the speech signal are compressed or expanded uniformly. Other methods are considered non-linear because they non-uniformly remove portions of the time signal. One example of a non-linear time-compression method is referred to as pause removal. When using this method, a speed processing algorithm attempts to identify and remove any pauses in a recording.

More information regarding audio time modification is given in an article that appeared in the March, 1997, issue of "ACM Transactions on Computer-Human Interaction" (Volume 4, Number 1, pages 3-38) (1997). For purposes of this disclosure, it can be assumed that audio time modification involves some combination of changing individual data stream samples, dropping certain samples, and adjusting presentation times of any samples that are actually rendered.

Figure 3:
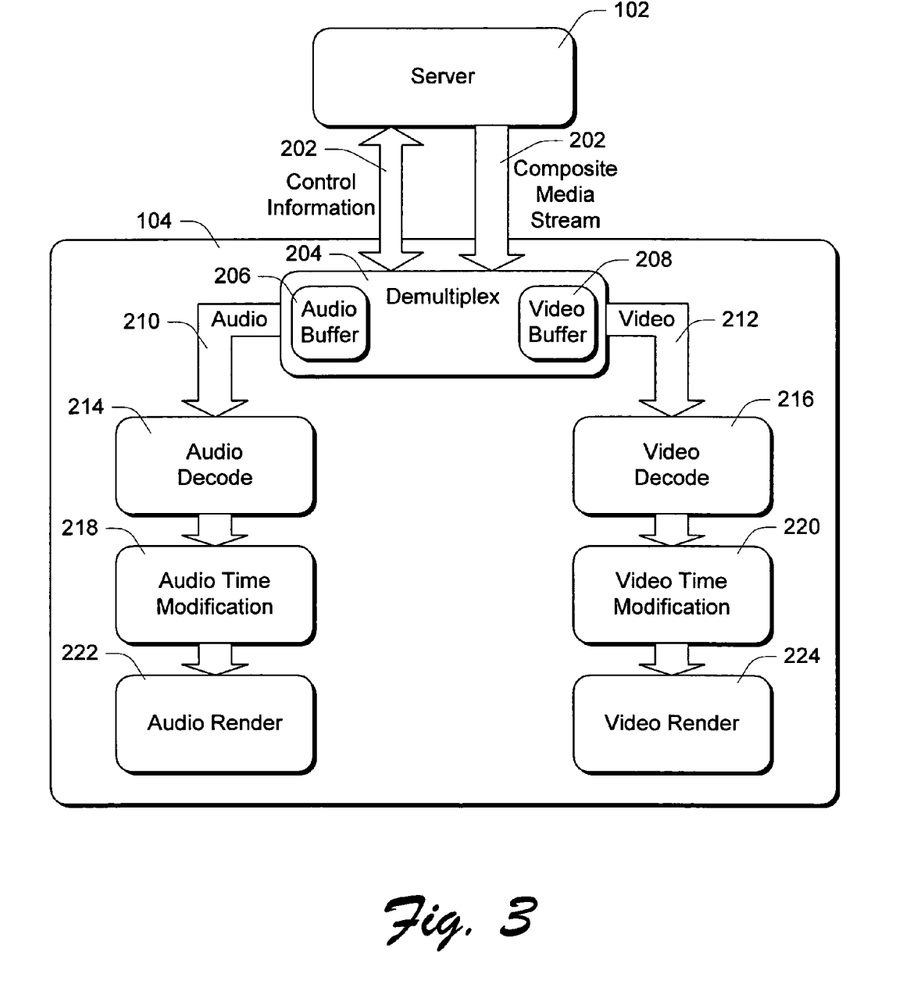
FIG. 3 illustrates a system in which timeline modification is performed by a client computer.

FIG. 3 illustrates a system in which timeline modification is performed by a client computer. Server 102 streams a composite media stream 202 to client 104. Additionally, other information 203, such as control-oriented signals and data, are also transferred bi-directionally between server 102 and client 104. The composite media stream 202 has a plurality of individual media streams as described above.

For purposes of discussion, it is assumed in this example that the composite media stream has an audio stream and a video stream.

Each media stream has a timeline, and the timelines of the individual streams are synchronized with each other so that the streams can be rendered in combination to produce coordinated multimedia content at the network client 104. The original timelines correspond to the original recording or rendition of the multimedia material, so that rendering the streams according to their timelines results in presentation speeds that closely match the speed of the original event or performance. In the case of audio streams, the timelines preserve the original speed and pitch of the original audio content.

The client computer has a demultiplexer component 204 that receives the composite media stream and that separates out the individual media streams from the composite format in which the data is streamed (such as ASF). The separate media streams are temporarily buffered in buffers 206 and 208, from which an audio stream 210 and a video media stream 212 are provided, respectively. The individual media streams are sent to and received by respective decoders 214 and 216 that perform in accordance with the particular data format being employed. For example, the decoders might perform data decompression.

The decoded data streams are then sent to and received by time modification components: an audio timeline modification component 218 and a video timeline modification component 220. These components receive input from a human operator in the form of a speed designation as described above. The timeline modification components change the timelines of the received media streams in accordance with the user speed designation to achieve either time compression or time expansion. With some types of media, such as video streams, this involves either omitting selected frames or modifying the presentation times of the individual data units or video frames. In other cases, such as with audio streams, some type of audio processing technique as the SOLA technique described above is used to time-compress or time-expand audio streams, while maintaining the original pitch of the audio and to also retain the intelligibility of the audio.

The timeline modification components 218 and 220 produce individual media streams that are provided to and received by respective renderers 222 and 224. The rendering components render the streams in accordance with their modified timelines, as the streams continue to be streamed from the network server. Alternatively, timeline modification components 218 and 220 might be eliminated and their functions performed by decoders 214 and 216.

Note that the speed designation or "playback speed", provided by the user, dictates the rate at which the network client consumes the composite data stream. Because of this, the client communicates the speed designation to the network server when requesting a particular composite media stream. The server responds by streaming the composite media stream at a rate that depends on or is proportional to the speed designation provided by the user. For example, for a speed factor of 2.0, the client consumes data at twice the normal rate. Accordingly, the server streams the composite media stream at twice its normal rate to meet the demands of the client. However, this rate may temporarily exceed twice its normal rate to achieve the seamless switching between playback speeds, as discussed in more detail below.

In various embodiments of the invention, the step of modifying the timeline of the requested multimedia content can be performed in the client as described above, or in an analogous manner in the server or in both the client and server. In the network environment, it is often desirable to avoid performing any significant timeline modification in the server. Otherwise, the server could quickly become overloaded with requests from multiple clients.

However, in some cases it may be desirable to store multiple versions of media streams at a server and to select particular versions of the media streams depending on the timeline requirements of the client, as designated by the user. One advantage of this method is that it can require comparatively less communications bandwidth between the server and client.

As a general example, a server might store a plurality of media streams having timelines modified by different factors. When a client requests a composite media stream, the server selects the version of the media stream whose timeline most closely accords with the speed designation set by the user. If the timeline does not exactly match the speed designation, the client can perform further timeline modification.

Figure 4:
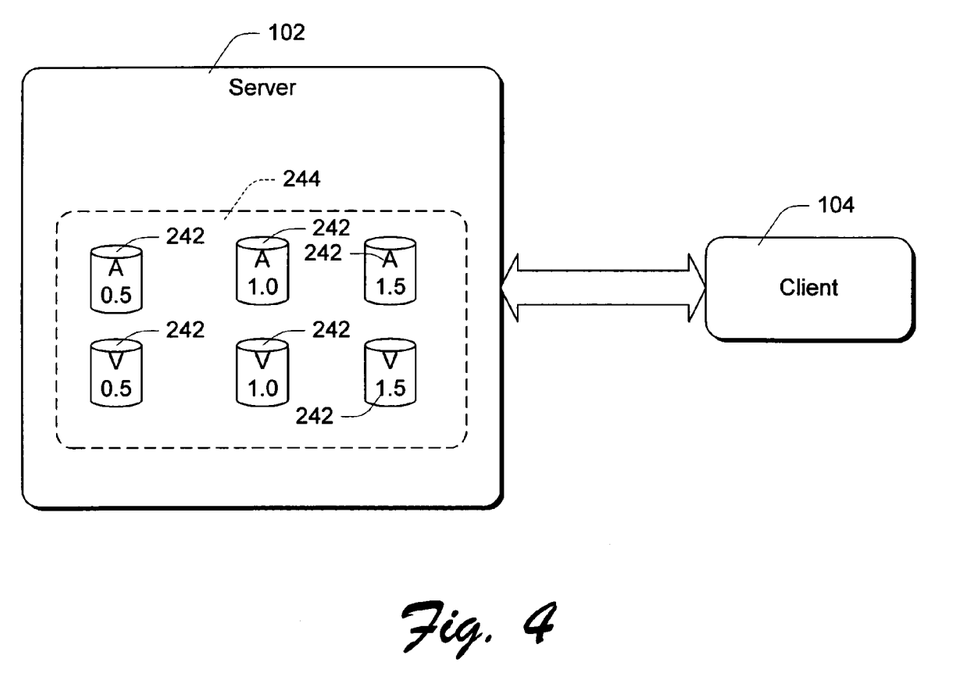
FIG. 4 illustrates a system in which multiple versions of media streams are stored at a server.

FIG. 4 illustrates a more specific example of storing multiple versions of media streams at a server. In this example, a server 102 stores multiple media streams 242 corresponding to specific multimedia content 244. The media streams are of different types, such as audio and video. In FIG. 4, audio streams are designated by the letter "A" and video streams are designated by the letter "V". Any combination of a single audio stream and a single video stream can be rendered to produce the multimedia content.

The various individual data streams have timelines that are modified by different degrees. The speed factors are indicated in FIG. 4. In this embodiment, the audio and corresponding video streams are organized as pairs, each pair forming a composite media stream having a timeline that has been modified by a factor of 0.5, 1.0, or 1.5.

When a client 104 requests multimedia content from server 102, the client 104 identifies both the content and the speed factor. In response, the server 102 selects the audio and video streams 242 that have timelines most closely approximating the identified speed factor, and combines those individual media streams to form the composite media stream. The resulting composite media stream is then sent to the client 104. When the timeline is accelerated, this saves bandwidth in comparison to sending an unaltered composite media stream having a higher streaming rate to meet the accelerated consumption demands of the client.

As a further optimization, the server can store composite media streams having different degrees of timeline modification and different degrees of quality. Generally, a media stream of a lower quality will consume less communications bandwidth than a media stream of a higher quality. Before selecting an appropriate media stream, the server determines the available bandwidth between the server and the client. It then selects a combination of individual media streams that provides the best quality while requiring no more than the available bandwidth.

When the user changes the playback speed, the client requests a new media stream that most closely corresponds to the requested speed. Playback is resumed in the new stream at the same point (relative to the subject content) at which it was discontinued in the old stream. Thus, the new stream is initiated at some intermediate point rather than at the beginning. When the streams are linearly altered, it is not difficult to determine the appropriate presentation time in the new stream. Specifically, the point in the new timeline equals oldtime(oldfactor/newfactor), where oldtime is the presentation time in the first media stream at which the speed change is to occur, oldfactor is the playback speed or factor of the old media stream, and newfactor is the playback speed or factor of the new media stream.

When non-linear timeline alteration is involved, the timeline correlations are compiled and stored as the non-linear compression is performed. The server stores one or more sets of timeline correlations between the timelines of the primary and timeline-altered media streams. These sets of correlations are arranged to allow cross-referencing between the various streams. For example, one set of correlations contains mappings from presentation times of the primary media stream (e.g., 1.0×) to timeline-correlated presentation times of the timeline-altered media streams (e.g., 0.5× and 1.5×). Other sets of correlations correspond to individual ones of the time-altered media streams. Each of these sets contains mappings from presentation times of the corresponding timeline-altered media stream to correlated presentation times of the primary media stream. A further discussion of these timeline correlations can be found in copending U.S. patent application Ser. No. 09/153,749, entitled "Timeline Correlation Between Multiple Timeline-Altered Media Streams," by inventors Anoop Gupta, Nosakhare D. Omoigui, and Liwei He.

User Experience

The functionality described above is exposed through an application program executed at a client computer 104, referred to herein as a streaming multimedia player. The streaming multimedia player may be incorporated into the operating system or run as a separate, self-contained application. In either case, the streaming multimedia player operates in a graphical user interface windowing environment such as provided by the "Windows" brand of operating systems, available from Microsoft Corporation of Redmond, Wash.

Figure 5:
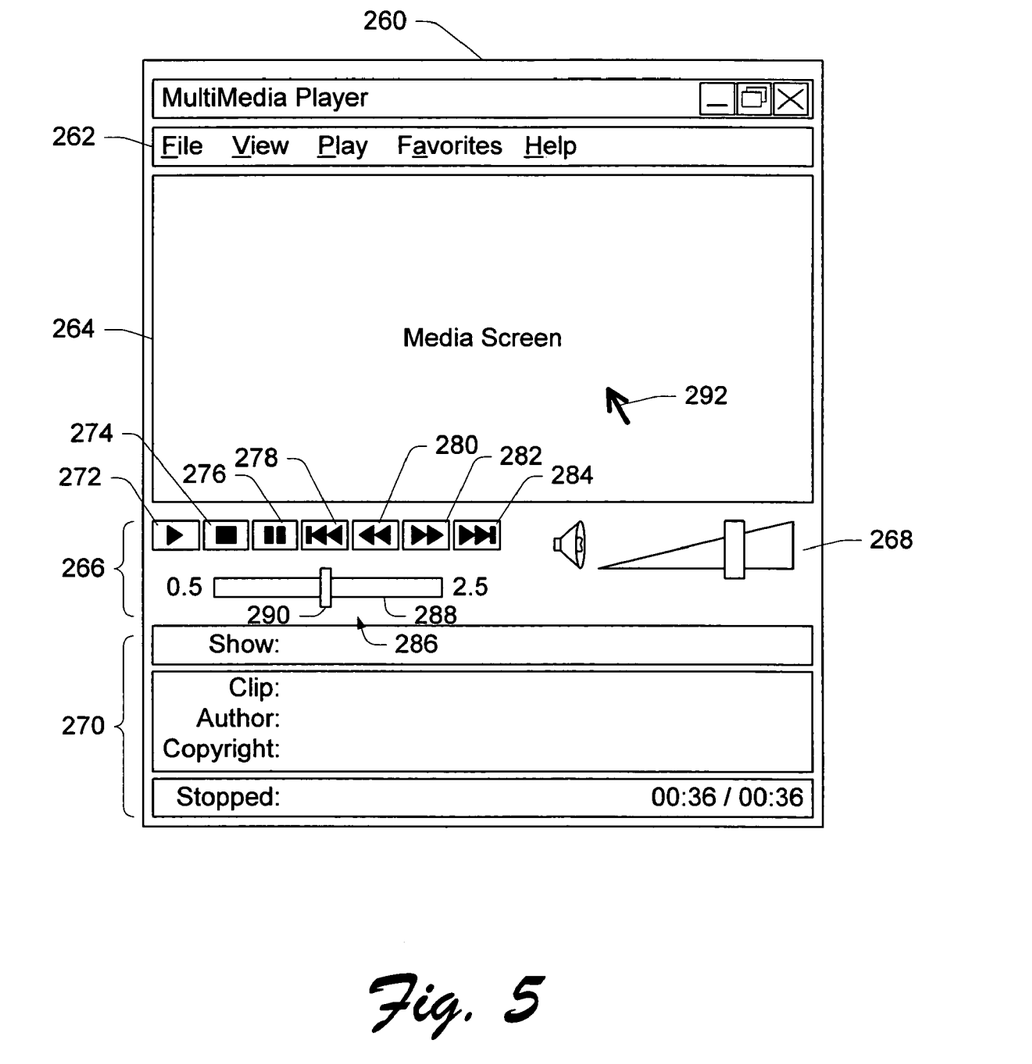
FIG. 5 shows one implementation of a graphical user interface window for a multimedia player.

FIG. 5 shows one implementation of a graphical user interface window 260 for the multimedia player. This UI window 260 has a command bar 262, a media screen 264, shuttle controls 266, a volume control 268, and content information space 270. Command bar 262 lists familiar UI commands, such as "File", "View" and so forth.

Media screen 264 is the region of the UI within which the multimedia content is rendered. For video content, the video is displayed on screen 264. For non-visual content, screen 264 displays static or dynamic images representing the content. For audio content, for example, a dynamically changing frequency wave that represents an audio signal is displayed in media screen 264.

Content information space 270 lists information pertaining to the multimedia content being rendered on the media screen 264. The content information space 270 includes the show name, author and copyright information, and tracking/timing data.

Shuttle controls 266 enable the user to control play of the multimedia content. Shuttle controls 266 include a play buttons 272, a stop button 274, a pause button 276, rewind buttons 278 and 280, fast forward buttons 282 and 284, and a scale mechanism 286. The user can actuate any of the shuttle controls 266 via a UI actuation mechanism, such as a pointer 292 or by tabbing to the desired play button and hitting the "enter" key.

Actuation of play button 272 initiates rendering of the multimedia content, and scale mechanism 286 can then be used to vary the speed of the content during rendering. The scale mechanism has a range of playback speeds 288, which in this example range from 0.5× to 2.5× the normal speed.

Scale mechanism 286 also has a movable slider 290 that is movable over the range 288. The user can position the slider 290 at the desired speed at which the multimedia player is to play the multimedia content.

In the FIG. 5 illustration, range 288 is a continuous range from a high playback speed (i.e., 2.5×) to a low playback speed (i.e., 0.5×). Slider 290 moves continuously over the range. In other implementations, range 288 is a discrete range of discrete playback speeds (e.g., 0.5×, 1.0×, 1.5×, 2.0×, and 2.5×) and the slider is movable among the discrete playback speeds.

Once the multimedia content is playing at one speed, the user is free to select a new speed by moving the slider 290 to a new speed. In response to user manipulation of the scale mechanism, the multimedia player begins playing at the new speed.

Alternatively, different mechanisms can be used to allow the user to alter the playback speed. For example, shuttle controls 266 may include multiple play buttons associated with different playback speeds of the multimedia content, such as a first button corresponding to a normal playback speed, a second button corresponding to a faster playback speed (e.g., a speed up factor of 25%), and a third button corresponding to a slower playback speed (e.g., a slow down factor of 50%). The user is able to select different playback speeds by selecting different ones of the multiple play buttons. By way of another example, shuttle controls 266 may include a single play button and a drop-down or pull-down menu associated with the play button. The menu includes multiple playback speeds (e.g., ×0.5, ×0.75, ×1.0, ×1.25, and ×1.5), any of which can be selected by the user.

Seamless Switching Operation

The seamless switching between different playback speeds is discussed with reference to a data stream. This data stream can be an individual data stream (e.g., an audio stream or a video stream), or alternatively a composite media stream.

One technique employed to achieve seamless switching between different playback speeds is referred to as "flow control". The client computer includes one or more data buffers (e.g., buffers 206 and 208 of FIG. 3) into which the data stream is stored upon receipt from the server. With flow control, the client computer attempts to maintain a particular amount (or particular range of amounts) of data in its data buffer(s). Flow control can be implemented in a variety of different manners. For example, a client computer may provide "start" and "stop" commands to the server to inform the server when it can stream data and when it should stop sending data. By way of another example, the server may stream data to the client in segments having a particular temporal duration (also referred to as a "window"). Once one segment or window's worth of data has been streamed, the server does not stream the next segment or window until an acknowledgement signal is received from the client.

In some embodiments, the server includes an intelligent data transfer mechanism that attempts to detect the rate at which the client computer is accepting data. By sending the data at that detected rate, the server can continue to transmit data to the client at a rate that is fast enough to keep desired amount of data in the client's buffers yet slow enough to avoid exceeding the buffers' capacities.

Figure 6:
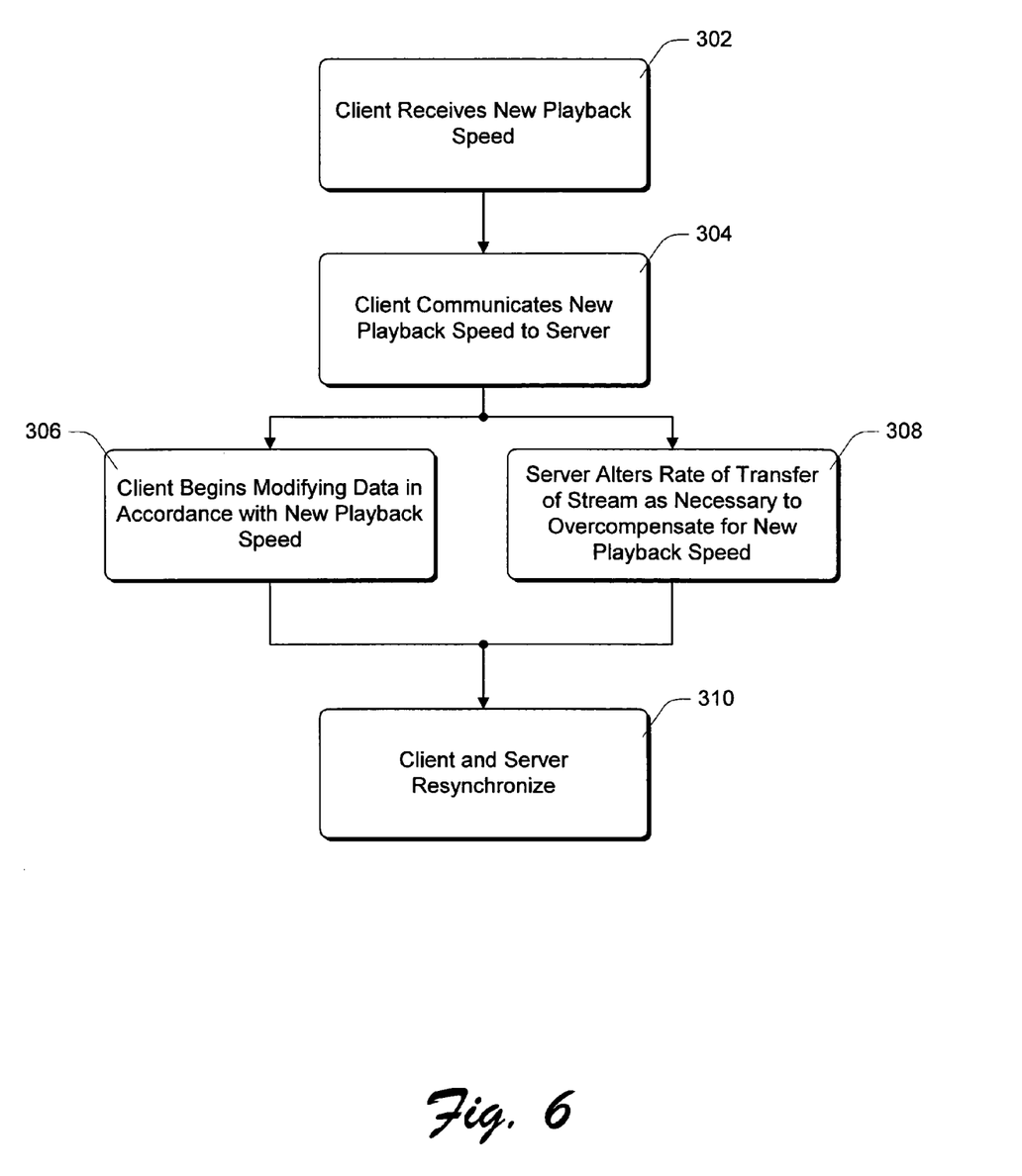
FIG. 6 is a flowchart illustrating exemplary steps followed in using flow control to seamlessly switch between different playback speeds.

FIG. 6 is a flowchart illustrating exemplary steps followed in using flow control to seamlessly switch between different playback speeds. In the example of FIG. 6, time-scale modification is performed at the client. The steps of FIG. 6 are implemented by a client 104 and a server 102 of FIG. 3, and may be performed in software. FIG. 6 is described with additional reference to components in FIG. 3.

The switching between different playback speeds is initiated upon receipt of a new playback speed selection from a user of client 104 (step 302). Client 104 communicates this new playback speed to server 102 (step 304). Client 104 then begins performing time-scale modification on the data in its buffers 206 and 208 in accordance with the newly selected playback speed (step 306). Concurrently, server 102 alters its rate of transfer of data to client 104 as necessary, overcompensating for the new playback speed (step 308). Server 102 overcompensates for the new playback speed by transmitting the data at a delivery rate that is most likely too fast a data rate. For example, if the previous playback speed was 1.0× and the new playback speed is 1.5×, then server 102 begins transmitting the data at a rate faster than what is necessary for 1.5× (e.g., twice the rate it was transferred for the 1.0× playback speed).

Server 102 overcompensates for the new playback speed because of a time lag between when client 104 starts consuming data at the new (faster) playback speed and when client 104 begins receiving the data stream from server 102 at the faster rate. For example, it takes time for notification of the new (faster) playback speed to be received by server 102, for server 102 to process the notification, and for server 102 to begin streaming the data to client 104 at an increased speed. During this time, client 104 is consuming the data in its buffers 206 and 208 in accordance with the new playback speed, which may have greatly reduced the amount of data in buffers 206 and 208. So, by overcompensating for the new playback speed, buffers 206 and 208 can be quickly refilled.

Overcompensating for the new playback speed may eventually cause the data buffers of client 104 to become too full. In embodiments where server 102 includes an intelligent data transfer mechanism to detect the rate at which client 104 is accepting data, client 104 and server 102 eventually resynchronize (step 310). After the immediate overcompensation in data transmission in step 308, server 102 can again learn the proper rate (based on the rate at which the client computer is accepting data) at which it should transfer data to client 104 in order to keep the client's buffer(s) filled with the desired amount of data.

By immediately transmitting data at a faster than needed rate in step 308, server 102 ensures that it provides client 104 with sufficient data for client 104 to immediately begin time modification in accordance with the new playback speed. Data that was transferred to client 104 at a rate based on the previous playback speed, and is still in the client's data buffers, is time-scale modified at the new playback speed while server 102 is aggressively refilling the data buffers. Thus, client 104 is able to render the streams at the new playback speed with very little (if any) noticeable delay and little or no noticeable break or pause between the user's submission of the new playback speed and the actual rendering at the new playback speed. However, upon receipt of the new playback speed some data is already in the process of being decoded (e.g., by decoders 214 and 216), modified (e.g., by modifiers 218 and 220), and rendered (e.g., by renderers 222 and 224). This data is still decoded, modified, and rendered (as appropriate) at the previous playback speed. However, once that data is rendered, any data in buffers 206 and 208 is decoded, modified, and rendered at the new playback speed.

The amount by which server 102 overcompensates in step 308 can be a fixed amount, such as using a delivery rate that is twice the new playback speed or a delivery rate that is 0.5× faster than the new playback speed (e.g., a new playback speed of 1.5× would result in an overcompensating delivery rate of 2.0×). Alternatively, server 102 may use a more intelligent approach to try to calculate more precisely what the delivery rate should be to keep the desired amount of data in the client's buffer(s).

Whether server 102 needs to alter its rate of transfer in step 308 is dependent in part on whether the new playback speed is faster or slower than the previous playback speed. If the new playback speed is faster than the previous playback speed, then server 102 increases its delivery rate in order to ensure that the buffers 206 and 208 of client 104 do not become empty. However, if the new playback speed is slower than the previous playback speed, then the current delivery rate is already too fast for the new playback speed. So, by not altering its rate of transfer, server 102 is already overcompensating for the new playback speed. Alternatively, if the difference between the previous playback speed and the new slower playback speed is insufficient, server 102 may increase its playback speed in step 308. However, even if server 102 does not alter its rate of transfer in step 308, client 104 and server 102 may still need to be resynchronized in step 310 if the new playback speed is sufficiently different than the previous playback speed.

Another technique employed to achieve seamless switching between different playback speeds is referred to as "stream tagging". With stream tagging, the server transfers data packets for a data stream to the client at a rate based on the playback speed requested by the user, and tags each data packet with an indication of the playback speed for which it was sent. The client then uses these tags to identify what playback speed to use.

Figure 7:
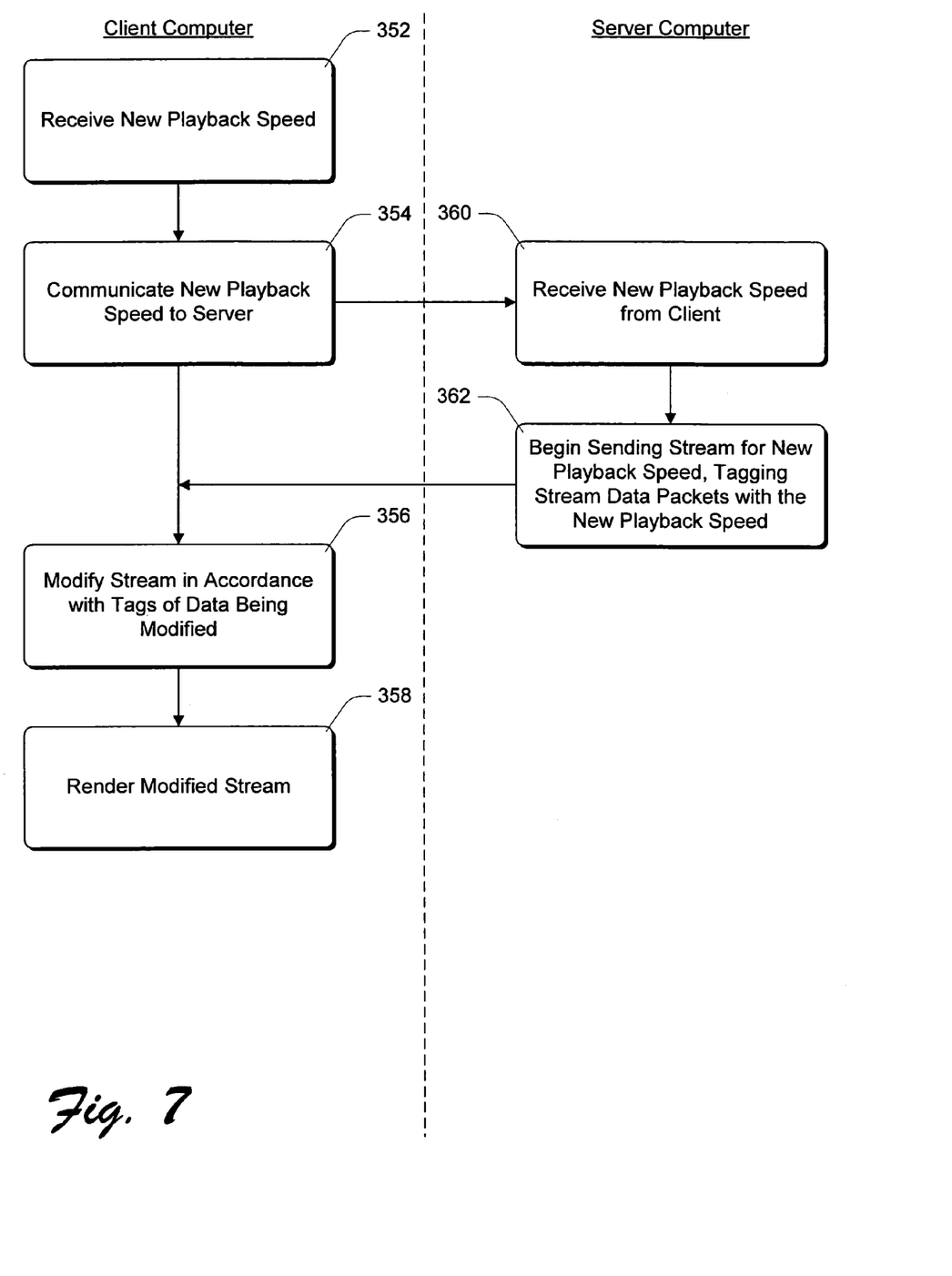
FIG. 7 is a flowchart illustrating exemplary steps followed in using stream tagging to seamlessly switch between different playback speeds.

FIG. 7 is a flowchart illustrating exemplary steps followed in using stream tagging to seamlessly switch between different playback speeds. In the example of FIG. 7, time-scale modification is performed at the client. The steps of FIG. 7 are implemented by a client 104 and a server 102 of FIG. 3, and may be performed in software. The steps illustrated on the left-hand side of FIG. 7 are implemented by client 104, while the steps illustrated on the right-hand side of FIG. 7 are implemented by server 102. FIG. 7 is described with additional reference to components in FIG. 3.

The switching between different playback speeds is initiated upon receipt of a new playback speed selection from a user of client 104 (step 352). Client 104 communicates this new playback speed to server 102 (step 354). Time modifiers 218 and 220 perform time-scale modification in accordance with the tags on the data being modified (step 356) and renderers 222 and 224 play back the modified stream (step 358). Thus, until the tags on the data are changed, client 104 continues to perform time-scale modification and render the streams according to the previous playback speed.

Server 102 receives the new playback speed from client 104 (step 360) and begins sending the stream at a rate corresponding to the new playback speed (step 362). In step 362 server 102 also tags the new data packets for the stream with the new playback speed. These data packets tagged with the new speed will be received into the buffers 206 and 208 of client 104. Time modifiers 218 and 220 perform their time-scale modification based on whatever rate is indicated by the tags. Thus, after the buffers 206 and 208 are emptied of all the data that was tagged at the previous playback speed, the decoding, time modification, and rendering of the streams at the new playback speed begins. Thus, the switch between the different playback speeds in accordance with the example of FIG. 7 causes little or no noticeable break or pause to the user.

Figure 8:
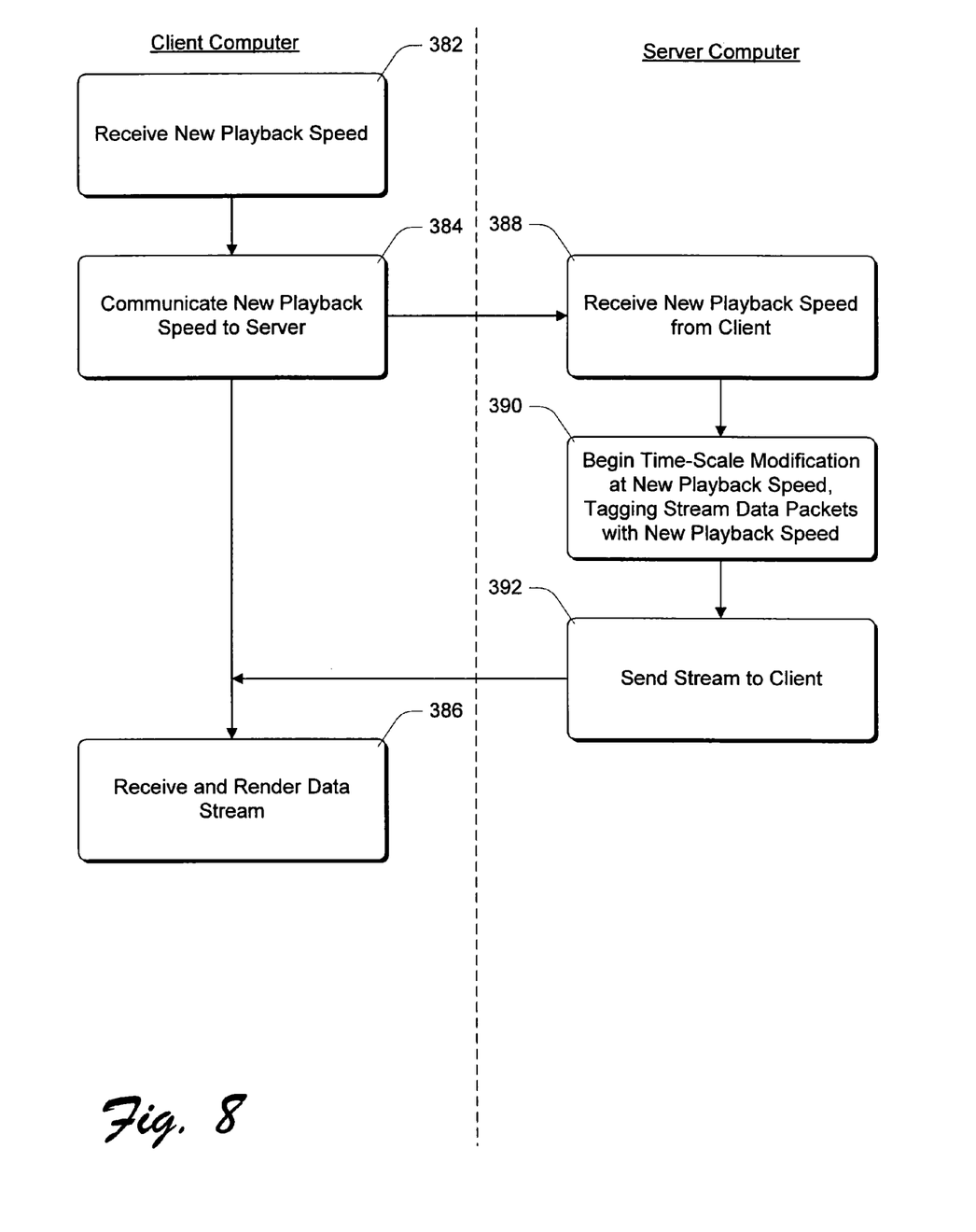
FIG. 8 is a flowchart illustrating another example of using stream tagging to seamlessly switch between different playback speeds.

FIG. 8 is a flowchart illustrating another example of using stream tagging to seamlessly switch between different playback speeds. In the example of FIG. 8, either different versions of media streams are stored at the server (as discussed above with reference to FIG. 4), or a single version of a stream is stored at the server and is time-scale modified by the server (analogous to FIG. 3 discussed above). The steps of FIG. 8 are implemented by a client 104 and a server 102 of FIG. 1, and may be performed in software. The steps illustrated on the left-hand side of FIG. 8 are implemented by client 104, while the steps illustrated on the right-hand side of FIG. 8 are implemented by server 102.

The switching between different playback speeds is initiated upon receipt of a new playback speed selection from a user of client 104 (step 382). Client 104 communicates this new playback speed to server 102 (step 384). Client 104 continues to receive and render the data stream as received (step 386).

Upon receipt of the new playback speed from client 104 (step 388), server 102 begins time-scale modification of the stream according to the new playback speed, tagging the data packets of the modified stream with the new playback speed (step 390). This time-scale modification of the stream could be selection of a new version of the stream, or alternatively modification performed by modifiers at the server analogous to modifiers 218 and 220 of FIG. 3. Alternatively the data packets may not be tagged with the playback speed.

The modified stream is then transferred to client 104 (step 392). Client 104 receives the modified stream and renders the data in accordance with the playback speed indicated in the received data packets (step 386). Thus, after the client has rendered all of the data tagged at the previous playback speed, it begins rendering the data at the new playback rate without any break or pause noticeable to the user.

Figure 9:
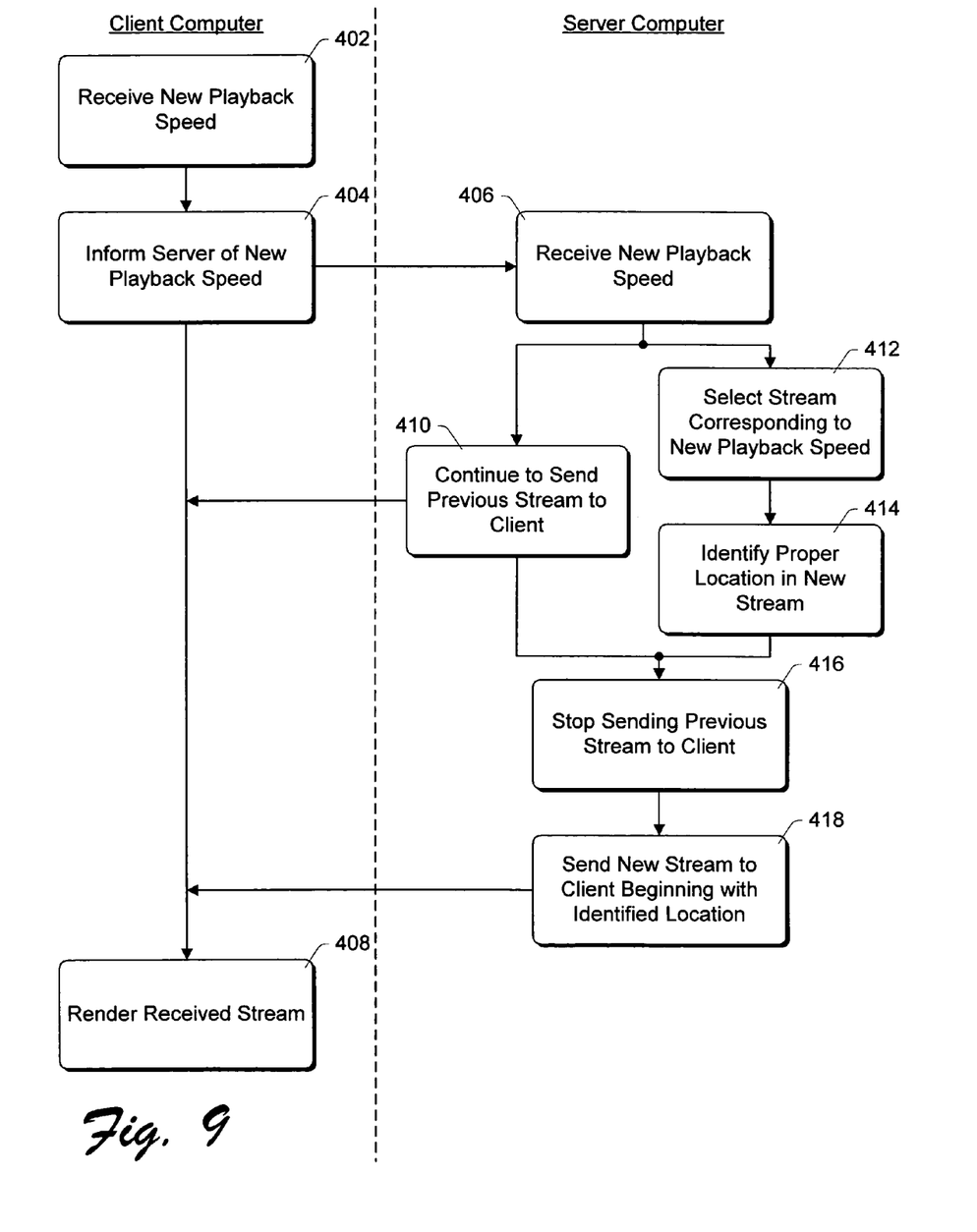
FIG. 9 is a flowchart illustrating another example of seamlessly switching between different playback speeds.

FIG. 9 is a flowchart illustrating another example of seamlessly switching between different playback speeds. In the example of FIG. 9, time-scale modification is performed by storing multiple versions of media streams at the server. The steps of FIG. 9 are implemented by a client 104 and a server 102 of FIG. 4, and may be performed in software. The steps illustrated on the left-hand side of FIG. 9 are implemented by client 104, while the steps illustrated on the right-hand side of FIG. 9 are implemented by server 102. FIG. 9 is described with additional reference to components in FIG. 4.

The switching between different playback speeds is initiated upon receipt of a new playback speed selection from a user of client 104 (step 402). Client 104 communicates the new playback speed to server 102, which receives the communication (steps 404 and 406). Client 104 continues to render the data stream it receives from server 102 (step 408). Thus, client 104 continues to render the previous data stream at the previous playback speed until the new data stream is received from server 102.

Server 102, upon receiving the new playback speed (step 406), continues to send the previous stream to client 104 (step 410). Concurrently with step 410, server 102 selects an appropriate stream 242 corresponding to the new playback speed (step 412) and identifies the proper location in the new stream (step 414). The proper location in the new stream is the same point in the new stream (relative to the subject content) at which sending of the previous stream will be discontinued. Alternatively, the proper location may actually be slightly before the point at which sending of the previous stream will be discontinued.

Once the proper location in the new stream is identified in step 334, server 102 stops sending the previous stream to client 104 (step 416) and immediately begins sending the new stream starting at the location identified in step 414 (step 418). Server 102 performs steps 414 and 416 almost (if not exactly) concurrently, so that the point at which sending of the previous stream will be discontinued can be accurately identified. The new stream is then received and rendered by client 104 (step 408), after any buffered data in client 104 from the previous stream is rendered.

Thus, it can be seen that server 102 continues to transmit the previous stream to the client while it is selecting the new stream to transmit to the client as well as the location in the new stream where transmission is to begin. Such concurrent operation by server 102 reduces breaks that can occur when switching between time-scale modified streams because the previous stream is still transmitted to and rendered by client 104 until server 102 is ready to transmit the new stream.

CONCLUSION

The invention described above provides seamless switching between different playback speeds of time-scale modified data streams. A user of a client computer can select different playback speeds for multimedia content that is streamed from a server to the client. The invention switches between these different playback speeds in a seamless manner, advantageously reducing breaks and/or delays between the time the user selects the new playback speed and the time the multimedia content begins being played back at the new speed.

Although the invention has been described in language specific to structural features and/or methodological steps, it is to be understood that the invention defined in the appended claims is not necessarily limited to the specific features or steps described. Rather, the specific features and steps are disclosed as preferred forms of implementing the claimed invention.

The invention claimed is:

1. A system for rendering a stream of data at different playback speeds, comprising:
    a component of a server that sends the stream of data for a first playback speed from the server to a client via a network;
    a component of the client that receives the stream of data;
    a component of the client that renders the received stream of data at the client at the first playback speed, switches the rendering of the received stream of data from the first playback speed to a second playback speed that is greater than the first playback speed, and notifies the server of the second playback speed; and
    a component of the server that, upon receiving notification of the second playback speed, initially sends to the client the stream of data that is timeline-modified for a third playback speed that is greater than the second playback speed and then sends to the client a stream of data that is timeline-modified for the second playback speed;
    wherein the component of the client that switches the rendering does so before the client starts receiving from the server the stream of data for the second playback speed and
    wherein the client renders the data sent for the third playback speed at the second playback speed.

2. The system of claim 1 wherein the component of the client that switches the rendering of the stream of data does so upon receiving an indication from a user to switch the playback speed without waiting to receive data for the second playback speed.

3. The system of claim 1 wherein the component of the server that sends the stream of data for the second playback speed does so when the client has a sufficient portion of the stream of data buffered.

4. The system of claim 1 wherein the switching from the first playback speed to the second playback speed results in no user-noticeable delay in the switching.

5. The system of claim 4 wherein the switching from the first playback speed to the second playback speed results in no user-noticeable pause in the rendering.

6. The system of claim 1 wherein the data includes video and audio data.

7. A server system for providing to a client a stream of data for different playback speeds, comprising:
    a component that sends to the client via a network the stream of data for a first playback speed;
    a component that receives from the client a notification of a second playback speed that is greater than the first playback speed; and
    a component that initially sends to the client the stream of data that is timeline-modified for a third playback speed that is greater than the second playback speed and then sends to the client the stream of data that is timeline-modified for the second playback speed to accommodate when the client switches to the second playback speed before it starts receiving the stream of data for the second playback speed and wherein the client renders the data sent for the third playback speed at the second playback speed.

8. The server system of claim 7 wherein the data includes video and audio data.

9. The server system of claim 7 to further accommodate when the client switches the rendering of the stream of data upon receiving an indication from a user to switch the playback speed.

10. A method for rendering a stream of data at different playback speeds, the method comprising:
    receiving from a server via a network a stream of data for a first playback speed;
    rendering the received stream of data at the first playback speed
    switching the rendering of the received stream of data from at the first playback speed to at a second playback speed that is greater than the first playback speed;
    notifying the server of the second playback speed; and
    after switching the rendering, initially receiving from the server the stream of data that is timeline-modified for a third playback speed that is greater than the second playback speed and then receiving from the server the stream of data that is timeline-modified for the second playback speed wherein the data received for the third playback speed are rendered at the switched second playback speed.

11. The method of claim 10 wherein the switching of the rendering of the stream of data is done upon receiving an indication from a user to switch the playback speed.

12. The method of claim 10 including receiving from the server the stream of data for the second playback speed at a speed required for the second playback speed when a sufficient portion of the stream of data has been buffered.

13. The method of claim 10 wherein the switching from the first playback speed to the second playback speed results in no user-noticeable delay in the switching.

14. The method of claim 13 wherein the switching from the first playback speed to the second playback speed results in no user-noticeable pause in the rendering.

15. The method of claim 10 wherein the data includes video and audio data.

16. A system that streams a video with frames from a server to a client at different playback speeds, a playback speed faster than a normal playback speed being simulated by skipping frames of the video, comprising:

a component that sends frames of the video for a first playback speed;

a component that receives an indication of a second playback speed that is greater than the first playback speed; and a component that upon receiving the indication,
  initially sends frames of the video that are timeline-modified for a third playback speed that is greater than the second playback speed; and
  then sends frames of the video that are timeline-modified for the second playback speed
so that the client renders the frames of the video for the third playback speed and the second playback speed at the second playback speed.

* * * * *